United States Patent
Renaudin et al.

(10) Patent No.: US 9,656,576 B2
(45) Date of Patent: May 23, 2017

(54) HEIGHT-ADJUSTABLE VEHICLE SEAT

(71) Applicant: DOREL JUVENILE GROUP, INC., Foxboro, MA (US)

(72) Inventors: Francois Renaudin, Cholet (FR); Nicolas Garnier, Saint Germain sur Moine (FR); Nicolas Pasquier, Cholet (FR)

(73) Assignee: Dorel Juvenile Group, Inc., Foxboro, MA (US)

( * ) Notice: Subject to any disclaimer, the term of this patent is extended or adjusted under 35 U.S.C. 154(b) by 193 days.

(21) Appl. No.: 14/349,391

(22) PCT Filed: Oct. 8, 2012

(86) PCT No.: PCT/EP2012/069891
§ 371 (c)(1),
(2) Date: Apr. 3, 2014

(87) PCT Pub. No.: WO2013/050610
PCT Pub. Date: Apr. 11, 2013

(65) Prior Publication Data
US 2014/0246888 A1 Sep. 4, 2014

(30) Foreign Application Priority Data

Oct. 7, 2011 (FR) ...................................... 11 59085

(51) Int. Cl.
*B60N 2/28* (2006.01)
*B60N 2/427* (2006.01)

(52) U.S. Cl.
CPC ......... *B60N 2/2803* (2013.01); *B60N 2/2806* (2013.01); *B60N 2/2866* (2013.01); *B60N 2/2884* (2013.01); *B60N 2/2887* (2013.01); *B60N 2/42763* (2013.01)

(58) Field of Classification Search
CPC ............................ B60N 2/2806; B60N 2/2887
USPC .............. 297/216.1, 216.11, 256.11, 256.16, 297/284.11, 317, 322, 344.15, 256.13
See application file for complete search history.

(56) References Cited

U.S. PATENT DOCUMENTS

| 4,603,903 | A | * | 8/1986 | Moscovitch | ......... | B60N 2/2866 |
| | | | | | | 297/256.11 |
| 4,768,827 | A | * | 9/1988 | Musgrove | ............ | B60N 2/3086 |
| | | | | | | 297/15 |
| 5,110,182 | A | | 5/1992 | Beauvais | | |
| 5,462,333 | A | * | 10/1995 | Beauvais | ............. | B60N 2/2821 |
| | | | | | | 297/216.11 |
| 5,609,393 | A | * | 3/1997 | Meeker | ................ | B60N 2/2821 |
| | | | | | | 297/216.19 |
| 6,019,426 | A | * | 2/2000 | Nakagawa | ............. | B60N 2/286 |
| | | | | | | 297/250.1 |

(Continued)

OTHER PUBLICATIONS

English translation of the Written Opinion from the ISA/EP and issued in connection with PCT/EP2012/069891.

(Continued)

*Primary Examiner* — David E Allred
(74) *Attorney, Agent, or Firm* — Barnes & Thornburg LLP

(57) ABSTRACT

A juvenile vehicle seat includes a squab (i.e. base) on which a child may sit when the squab is placed on a passenger seat in a vehicle. The orientation of the squab relative to the passenger seat may be varied at the option of a caregiver.

11 Claims, 3 Drawing Sheets

(56) References Cited

U.S. PATENT DOCUMENTS

| | | | | |
|---|---|---|---|---|
| 6,045,184 A * | 4/2000 | Nakagawa | ........... | B60N 2/2821 297/250.1 |
| 6,053,573 A * | 4/2000 | Nakagawa | ........... | B60N 2/0284 297/237 |
| 6,312,050 B1 * | 11/2001 | Eklind | ................ | B60N 2/4221 297/216.15 |
| 6,428,099 B1 * | 8/2002 | Kain | .................... | B60N 2/2806 297/250.1 |
| 7,300,113 B2 * | 11/2007 | Baloga | ................ | B60N 2/2803 297/250.1 |
| 8,256,840 B2 * | 9/2012 | Dasent | ................ | B60N 2/2806 297/253 |
| 8,845,022 B2 * | 9/2014 | Strong | .................... | B60N 2/46 297/256.16 |
| 9,132,754 B2 * | 9/2015 | Mindel | ................ | B60N 2/2824 |
| 2009/0102253 A1 * | 4/2009 | Forbes | ................ | B60N 2/2884 297/216.11 |
| 2009/0218859 A1 * | 9/2009 | Lawall | ................ | B60N 2/4279 297/216.1 |
| 2009/0256404 A1 | 10/2009 | Strong et al. | | |
| 2010/0244518 A1 * | 9/2010 | Fiore, Jr. | ................ | A47D 1/004 297/256.11 |
| 2013/0088058 A1 * | 4/2013 | Szakelyhidi | ......... | B60N 2/2806 297/256.16 |
| 2014/0001803 A1 * | 1/2014 | Chapman | ............... | B60N 2/265 297/256.11 |
| 2015/0151653 A1 * | 6/2015 | Furuta | ..................... | B60N 2/68 297/344.15 |

OTHER PUBLICATIONS

PCT International Search Report and Written Opinion completed by the ISA/EP on Oct. 24, 2012 and issued in connection with PCT/EP2012/069891.

* cited by examiner

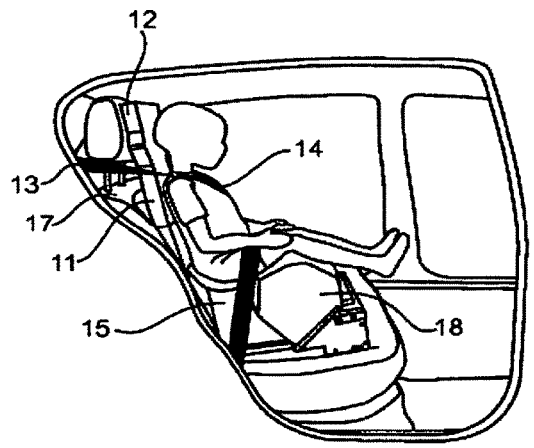
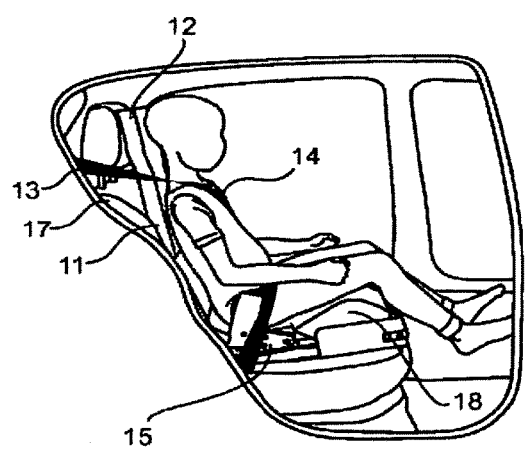
Fig. 1A              Fig. 1B
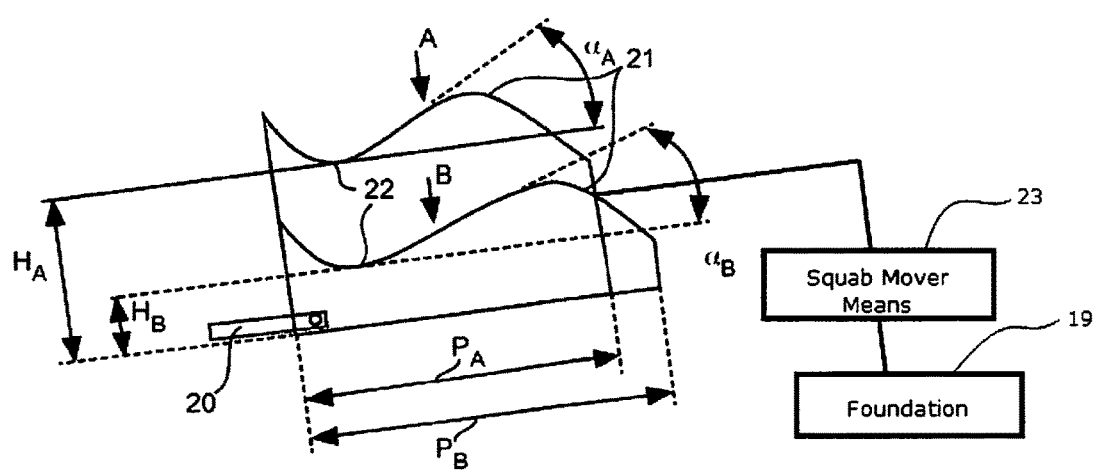
Fig. 2

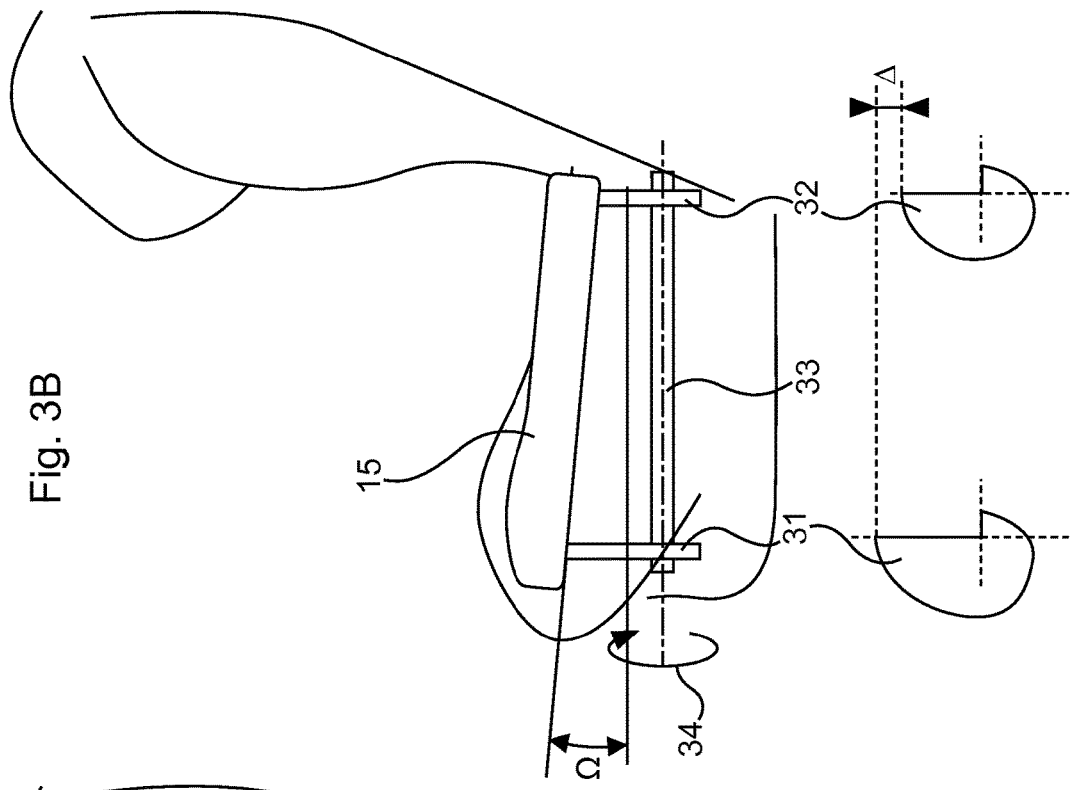
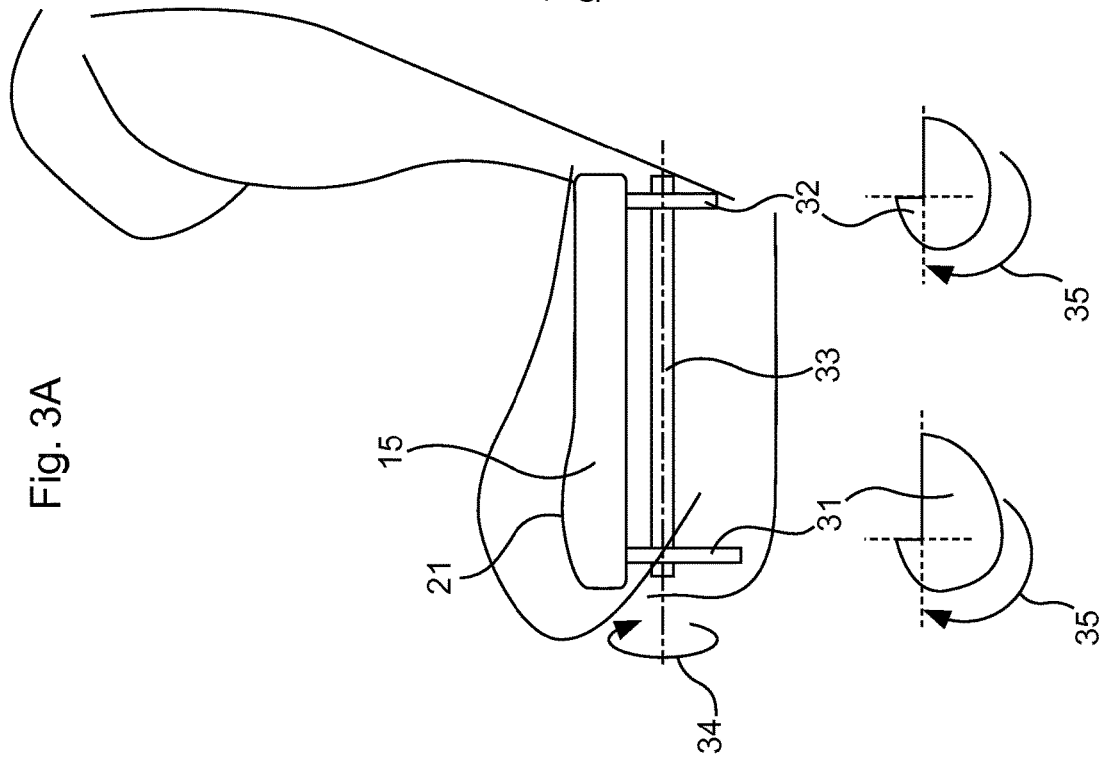

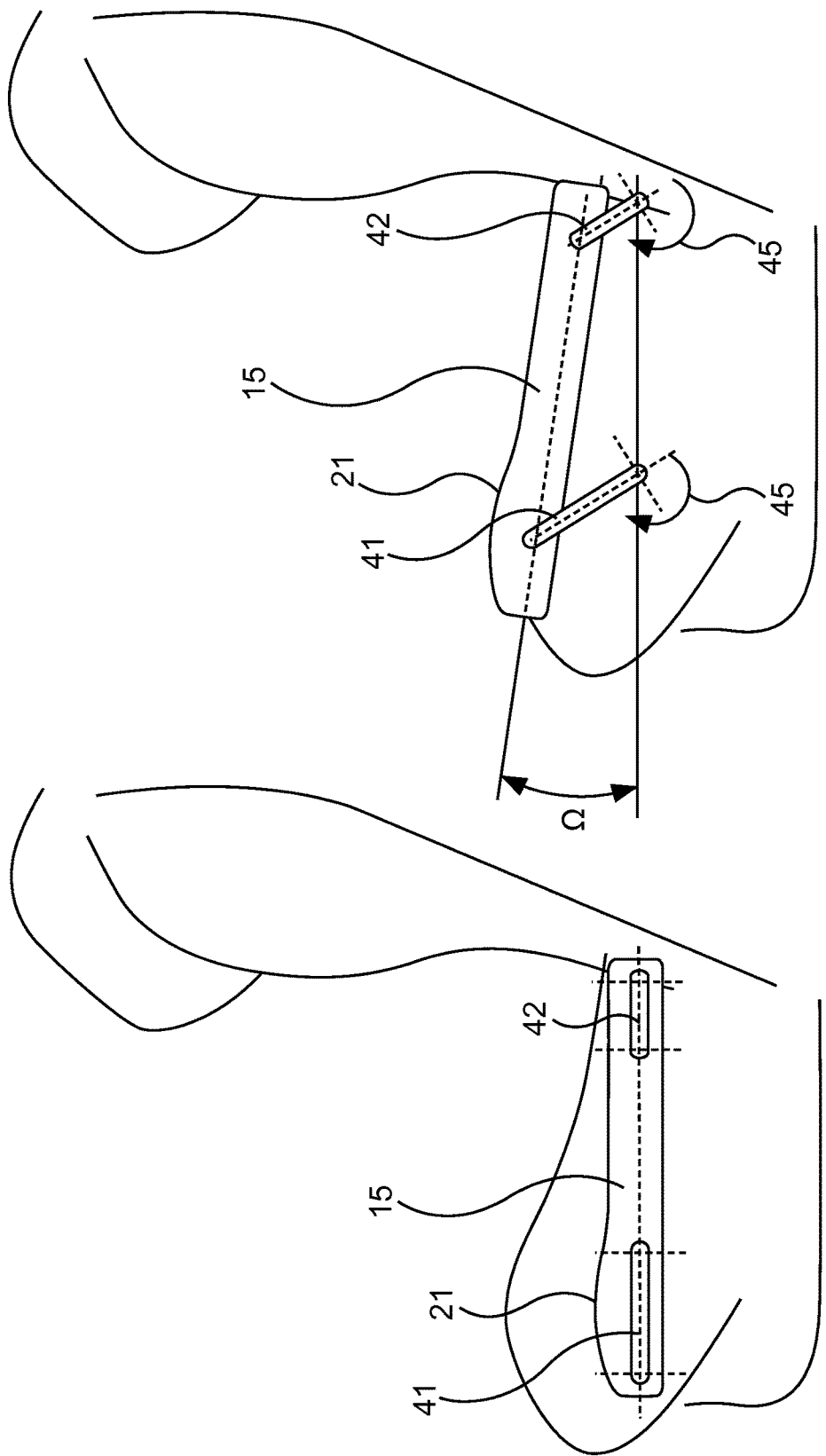

HEIGHT-ADJUSTABLE VEHICLE SEAT

CROSS REFERENCE TO RELATED APPLICATIONS

This application is a U.S. nationalization under 35 U.S.C. §371 of International Application No. PCT/EP2012/069891, filed Oct. 8, 2012, which claims priority to French Application No. 1159085, filed Oct. 7, 2011.

The field of the invention is that of child welfare. More precisely, the invention concerns car seats for children that are intended to be installed on the passenger seats of vehicles. It concerns in particular car seats adapted to receive children of variable sizes and/or weights and able to be adjusted so as to take into account the development of a child over several years. Thus the invention applies to adjustable car seats where in particular the headrest can be adjusted for height with respect to the backrest.

In particular, the invention applies to Group 2/3 seats, for children whose weight is between 15 and 36 kg, as well as, in some embodiments, to seats in so-called Group 1/2/3 car seats, enabling the car seat in the Group 1 category, for children whose weight is between 9 and 18 kg, to evolve to Group 2/3 category for children whose weight is between 15 and 36 kg.

Car seats in Group 1/2/3 suited both to small and to large children, that is to say adjustable, are known. These car seats must be adapted to various types of holding, namely a harness with shoulder straps secured to the car seat for the smallest children (Group 1) and, as from the age of three years, the use of the three-point belt of the car to attach the child (Group 2/3).

The invention concerns in particular the optimisation of the use of this three-point belt.

Car seats are generally adjustable, to adapt to the size and morphology of the child. In particular, in order to ensure the safety of the child as well as its comfort, it is necessary for the diagonal strap to be placed precisely at the shoulder of the child. For this purpose, this diagonal strap is mounted in a strap guide, itself mounted on the back rest of the seat and usually, on a head rest, the position of which is adjustable along the back rest. Thus, by moving the head rest along the back rest, in order to place it at the correct height with respect to the position of the head of the child, the strap guide is moved simultaneously, which brings the diagonal strap level with the shoulder of the child.

One drawback of this approach is that the angle formed by the strap above the strap guide on the one hand and below the strap guide on the other hand varies according to the position of the head rest. It is however desirable for the strap to extend as straight as possible and not to have any significant variation in angle before and after the strap guide.

Moreover, the holding of the children by the diagonal strap of the safety belt is sometimes insufficiently effective. This is because, in the event of impact or significant deceleration, the body of the child has a tendency to slide forwards and to pass under the safety belt. This phenomenon is known by the term submarining.

To combat this phenomenon, the squab of the car seat is sometimes equipped with a protrusion or an anti-submarining element that extends in front of the pelvis of the child in order to prevent or reduce forward sliding.

However, this is generally not sufficient in particular because the car seat also moves forwards at the time of an impact or deceleration.

The objective of the invention is in particular to overcome at least some of these drawbacks.

More precisely, one objective of the invention is to provide a car seat providing more effective and more secure holding of a child, in particular in the case of impact or deceleration.

In particular, one objective of the invention is to provide such a car seat for combating the phenomenon of submarining.

A secondary objective of the invention is to provide such a car seat providing more effective guidance of the diagonal strap.

These objectives, as well as others, which will emerge more clearly subsequently, are achieved by means of a car seat for a child comprising a squab.

According to the invention, said squab is adjustable for height between at least two positions, so as to place the child in an appropriate position with respect to a diagonal strap of a safety belt on a vehicle intended to hold the child in said seat, said squab carries an anti-submarining element, intended to oppose a sliding of the child under said abdominal strap, in particular in the event of impact or deceleration, and said seat is equipped with securing clamps for attaching said seat to attachment loops provided for this purpose in the vehicle.

Thus the diagonal strap is always placed optimally since the position of the head and shoulder of the child with respect to the strap does not change. The head and shoulder of the child are thus placed correctly whatever the size of the child, by moving the squab for height.

Moving the squab upwards does however introduce one drawback. This is because it increases the risk of submarining. To combat this problem, the invention provides a combination of two aspects, the presence of an anti-submarining element, for example a protrusion, and securing clamps, in particular of the Isofix® type. It should be noted that the latter aspect is not obvious, although these clamps are known. This is because in the case where the child, and therefore the seat, are held by the safety belt, it is considered that there is no need for such clamps, which appear redundant, and therefore unnecessary.

It should be noted that, according to the invention, such a car seat may also comprise a back rest, a head rest, and lateral protections intended to protect the thorax of the child in the event of impact. However, these elements are optional. In particular, the back rest may be omitted in whole or in part (for example, only a lower part of the back rest is kept), so that the child leans directly on the vehicle seat. Likewise, the car seat may not have a head rest: in this case, it is possible for example to provide, on either side of the squab, lateral head and thorax protections in a single piece. Finally, the seat may consist solely of a squab adjustable for height, without other lateral protections or back rest.

In this case, the diagonal strap may pass freely, from its point of fixing to the vehicle, over the shoulder of the child, or through a passage (for example an indentation) formed for example in the lateral protection of the seat, or consisting of the space left free between the back rest of the vehicle and the lateral protection of the car seat.

According to a particular embodiment, said seat comprises a back rest carrying elements for guiding said diagonal strap, said guidance elements being fixed with respect to said back rest.

Thus the diagonal strap is always guided optimally since the position of the strap guide with respect to the back rest does not change. On the other hand, the position of the strap with respect to the head and shoulder of the child remains optimum because of the adjustment for height of the squab of the car seat.

According to a particular embodiment, said anti-submarining element is adjustable between at least two positions.

This makes it possible to optimise the role of this anti-submarining element according to the size of the child.

According to a particular embodiment, the adjustments of said squab and said anti-submarining element are linked. Thus, by adjusting the position of the squab for height, the anti-submarining element is also adapted, simply and rapidly.

According to various embodiments, the adjustment of said anti-submarining element may in particular act on at least one of the aspects belonging to the following group:
adjustment of the protrusion height;
adjustment of the position with respect to said squab;
adjustment of the inclination.

According to another aspect of the invention, the depth of said squab may be adjustable. In this way, the squab may be adapted to the size of the child, and in particular the length of its legs.

In this case, the adjustments of the height and depth of said squab may be linked.

According to another aspect of the invention, the inclination of said squab is adjustable, and the adjustments of the height and inclination of said squab are linked.

In this way, the risks of submarining are reduced further since, for a small child, for whom the squab will be adjusted to the high position, the squab will also be inclined towards the rear, which will reduce the risks, in the event of impact of deceleration, of the child sliding under the abdominal strap.

Depending on the embodiment, said adjustments use at least one of the elements belonging to the group comprising links, cams and worms.

According to a particular embodiment of the invention, the adjustment of the height of the squab uses at least two cams or two links situated respectively at the front and rear of said squab, and the amplitude of the rear cam or link is less than that of the front cam or link, so that raising the squab causes it to slope towards the rear.

Other features and advantages of the invention will emerge more clearly from a reading of the following description of embodiments of the invention, given by way of illustration and non-limitatively and accompanied by the drawings, among which:

FIGS. 1A and 1B illustrate, seen from the side, a car seat according to the invention, respectively:
FIG. 1A: in a high position of the squab (small child);
FIG. 1B: in a low position of the squab (large child);
FIG. 2 presents, schematically, the position of the anti-submarining protrusion, in the positions in FIGS. 1A and 1B respectively;
FIGS. 3A and 3B present a first example of a mechanism for raising the squab based on cams;
FIGS. 4A and 4B illustrate a second example of a mechanism for raising the squab based on links.

The invention therefore proposes a novel type of car seat for children, providing effective and secure positioning of the diagonal safety belt strap, whatever the size of the child, while effectively combating the phenomenon of submarining.

For this purpose, as can be seen in FIGS. 1A and 1B illustrating a first embodiment of the invention, the back rest 11 of the seat is equipped with a head rest 12 and a strap guide 13 fixed with respect to the back rest.

This strap guide 13 has been designed and placed on the back rest in an optimum position for ensuring guidance of the safety belt strap 14.

Thus, whatever the size of the child, the head and shoulders of the latter are all the time in the same position with respect to the height of the back rest and therefore with respect to the strap guide 13. For this purpose, the strap 15 is adjustable for height, so as to adapt the distance between this back rest and the head rest to the size of child.

When the child is small, as illustrated in FIG. 1A, the squab is placed in the high position. Conversely, for a large child, as illustrated in FIG. 1B, the squab 15 is brought downwards.

This approach is therefore effective, for guiding the diagonal safety belt strap. On the other hand, it may amplify the risks of submarining, in particular when the squab is placed in the high position. To combat this phenomenon, an anti-submarining protrusion is used, which is preferably adjustable according to the position of the squab.

In addition, the seat is equipped with Isofix® clamps (not visible in FIGS. 1A and 1B, but shown schematically in FIG. 2, reference 20), which hold the back rest 11 pressed against the back rest 17 of the vehicle.

As can be seen in FIG. 1A, the front part 18 of the squab forms a larger angle with the horizontal in the case where the squab is in the high position than in the case in FIG. 1B.

Thus the anti-submarining protrusion 21 is placed suitably, according to the morphology of the child being transported. FIG. 2 shows schematically the top part of the squab and the anti-submarining protrusion 21, respectively in the case of FIG. 1A (arrow A) and FIG. 1B (arrow B).

The squab may adopt at least two distinct positions in height $H_A$, $H_B$. Several intermediate positions may of course be provided. The adjustment between two extreme positions may also be continuous.

The squab therefore has a hollow 22, level with the buttocks of the child, and then an anti-submarining protrusion 21, the position of which is adapted according to the position of the pelvis and legs of the child. Its inclination $\alpha_A$, $\alpha_B$ may also be adjusted in order to maximise the anti-submarining action.

More generally, the shape, the volume and the level with respect to the top surface of the squab and/or the angle formed with respect to the horizontal by the anti-submarining protrusion may be adapted according to the height of the squab.

Moreover, according to a particular embodiment, the depth $P_A$, $P_B$ of the squab is also adjustable in order to adapt even better to the size of the child.

Although the various adjustments may be independent, an advantageous approach is to link them to each other. Thus changing from height $H_A$ to height $H_B$ automatically causes a change from the depth $P_A$ to the depth $P_B$ and/or a change from the inclination $\alpha_A$ to the inclination $\alpha_B$.

These various movements may be controlled by a manual action, for example by squab-mover means 23 of a crank or knob. In other embodiments, these movements may be motorised.

The squab-mover means 23 between a foundation 19 and the squab 18 may for example use links, cams, worms, racks, gears, etc.

A first example of a mechanism for raising the squab of the car seat according to the invention, based on cams, is now presented in relation to FIGS. 3A and 3B.

The squab 15, having an anti-submarining protrusion 21, is mounted on two cams, a front cam 31 and a rear cam 32. These two cams 31, 32 are secured to the same spindle 33, able to move in rotation (arrow 34), for example by means of manual manipulation of a crank or knob, not shown in the figure. The rotation 34 of the spindle 33 causes the rotation 35 of the cams 31 and 32, which causes the raising of the squab 15.

In addition, provision is advantageously made for the front cam 31 to be of greater amplitude than the rear cam so that, apart from the raising of the squab 15, the rotation 35 of the cams 31 and 32 also causes its inclination Ω because of the difference in amplitude A between the two cams.

It should be noted that the movement of the cams 31, 32 is continuous when the spindle 33 is rotated so that the inclination Ω changes progressively, as the squab 15 is raised.

FIG. 3A therefore illustrates a first low position of the squab 15, suited to a large child, in which the inclination of the squab is substantially zero.

FIG. 3B for its part illustrates a second high position of the squab 15 suited to a child of small size, in which the inclination of the squab is of value Ω.

FIGS. 4A and 4B illustrate another embodiment in which the raising of the squab 15 is done by means of links, namely a front link 41 situated under the front part of the squab 15 and a rear link 42 situated under the rear part of the squab 15. The front link 41 is therefore substantially situated under the anti-submarining protrusion 21.

Provision is made for the front link 41 to be longer than the rear link 42. The simultaneous rotation of the links, represented by the arrows 45, causes the raising of the squab 15. Conjointly, the difference in length between the links 41 and 42 causes the inclination Ω of the squab 15.

Thus the anti-submarining protrusion 21 is placed in a suitable fashion according to the morphology of the child being transported.

FIG. 4A therefore illustrates a first low position of the squab 15, suited to a large child, in which the inclination of the squab is substantially zero.

FIG. 4B for its part illustrates a second high position of the squab 15 suited to a small child, in which the inclination of the squab is of value Q.

As in the example in FIG. 2, the mechanisms of FIGS. 3A-3B and 4A-4B are therefore designed so that the change of the squab 15 from a height $H_A$ to a height $H_B$ automatically causes change from an inclination $\alpha_A$ to an inclination $\alpha_B$.

It should be noted that, in FIGS. 3 and 4, the car seat of the invention has been shown as comprising, apart from the squab, a back rest, head rest and lateral protections. As already previously mentioned, the invention also concerns such a car seat that would be devoid in whole or in part of a back rest and/or head rest and/or lateral protections. This is because the simple presence of a squab adjustable for height, combined with the presence of an anti-submarining element and securing clamps (for example Isofix® clamps, not visible in FIGS. 3A-3B, 4A-4B) suffices to solve the technical problem of the invention, namely providing a car seat ensuring more effective and more secure holding of a child, in particular in the event of impact or deceleration, by means of an optimised belt strap passage and a reduction in the submarining effect.

The invention claimed is:

1. A juvenile car seat comprising
   a seat base including a foundation adapted to set on a seat bottom of a passenger seat in a vehicle and a squab adapted to support buttocks of a child and arranged to overlie and move relative to the foundation, the squab including a rear squab portion adapted to lie adjacent to a seat back of the passenger seat and an opposite front squab portion arranged to lie in close proximity to a forward edge of the seat bottom of the passenger seat when the foundation is placed on the seat bottom of the passenger seat,
   an anti-submarining protrusion coupled to the front portion and arranged to extend upwardly away from the foundation and laterally across the front squab portion, and
   squab-mover means for moving the squab upwardly relative to the foundation and for simultaneously changing inclination of the squab relative to a horizontal reference plane to cause movement of the squab relative to the foundation from an uninclined low position through an acute angle to an inclined high position to raise the rear squab portion to a first higher distance above the foundation and to raise the front squab portion to a relatively higher second higher distance above the foundation so that inclination of the squab is changed when the front squab portion and the anti-submarining protrusion coupled to the front squab portion are raised upwardly relative to the foundation and so the entire squab is raised to a position higher than the uninclined low position.

2. The juvenile car seat of claim 1, wherein the squab-mover means includes a front cam associated with the front squab portion and mounted for rotation about an axis, a rear cam associated with the rear squab portion and mounted for rotation about an axis, and a cam rotater arranged to rotate each of the front and rear cams about the axes to move the squab upwardly relative to the foundation and simultaneously change inclination of the squab.

3. The juvenile car seat of claim 2, wherein the axes of the front and rear cams are coextensive.

4. The juvenile car seat of claim 2, wherein the cam rotater is a single, rotatable spindle coupled to each of the front and rear cams.

5. The juvenile car seat of claim 2, wherein the front cam has an amplitude greater than an amplitude associated with the rear cam.

6. The juvenile car seat of claim 2, wherein the front and rear cams are arranged to rotate continuously in response to rotation of the cam rotater to cause inclination of the squab to change progressively as the squab is moved upwardly relative to the foundation.

7. The juvenile car seat of claim 2, wherein the front cam is arranged to underlie the anti-submarining protrusion.

8. A juvenile car seat comprising
   a seat base including a foundation adapted to set on a seat bottom of a passenger seat in a vehicle and a squab adapted to support buttocks of a child and arranged to overlie and move relative to the foundation, the squab including a rear squab portion adapted to lie adjacent to a seat back of the passenger seat and an opposite front squab portion arranged to lie in close proximity to a forward edge of the seat bottom of the passenger seat when the foundation is placed on the seat bottom of the passenger seat,
   an anti-submarining protrusion coupled to the front portion and arranged to extend upwardly away from the foundation and laterally across the front squab portion, and squab-mover means for moving the squab upwardly relative to the foundation and for simultaneously changing inclination of the squab relative to a horizontal reference plane to cause movement of the squab relative to the foundation from an uninclined low position through an acute angle to an inclined high position to raise the rear squab portion to a first higher distance above the foundation and to raise the front squab portion to a relatively higher second higher distance above the foundation so that inclination of the squab is changed when the front squab portion and the anti-submarining protrusion coupled to the front squab portion are raised upwardly relative to the foundation and so the entire squab is raised to a position higher than the uninclined low position, wherein the squab-mover means includes a front link coupled to the front squab portion and mounted on the foundation for pivotable movement about a front foundation pivot axis, a rear link coupled to the rear squab portion and mounted on the foundation for pivotable movement about a rear foundation pivot axis arranged to lie in spaced-apart parallel relation to the front foundation pivot axis, the front link has a length that is relatively longer than a length of the rear link, and pivoting movement of the front and rear links in a direction towards a seat back of the passenger seat moves the squab upwardly relative to the foundation and simultaneously changes inclination of the squab.

9. The juvenile car seat of claim 8, wherein the front link has a rear end pivotably coupled to the foundation at the front foundation pivot axis and a forward end pivotably coupled to the front squab portion at a front squab pivot axis and the rear link has a rear end pivotably coupled to the foundation at the rear foundation pivot axis and a forward end pivotably coupled to the rear squab portion at a rear squab pivot axis.

10. The juvenile car seat of claim 8, wherein the front link is arranged to underlie the anti-submarining portion.

11. The juvenile car seat of claim 8, wherein the front and rear links are arranged to pivot continuously in a clockwise direction about their respective pivot axes to cause inclination of the squab to change progressively as the squab is moved upwardly relative to the foundation.

* * * * *